(12) United States Patent
Huang

(10) Patent No.: US 8,806,737 B2
(45) Date of Patent: Aug. 19, 2014

(54) METHODS OF MAKING ENERGY EFFICIENT COOKWARE

(75) Inventor: Lee Lisheng Huang, Palo Alto, CA (US)

(73) Assignee: Eneron Inc., Palo Alto, CA (US)

( * ) Notice: Subject to any disclaimer, the term of this patent is extended or adjusted under 35 U.S.C. 154(b) by 271 days.

(21) Appl. No.: 12/723,605

(22) Filed: Mar. 12, 2010

(65) Prior Publication Data

US 2010/0242257 A1  Sep. 30, 2010

Related U.S. Application Data

(63) Continuation-in-part of application No. 12/413,444, filed on Mar. 27, 2009, now Pat. No. 8,037,602, and a continuation-in-part of application No. PCT/US2009/051980, filed on Jul. 28, 2009.

(51) Int. Cl.
| | |
|---|---|
| *B21D 21/00* | (2006.01) |
| *B23P 11/00* | (2006.01) |
| *A47J 27/00* | (2006.01) |
| *A47J 27/022* | (2006.01) |
| *B23P 15/00* | (2006.01) |

(52) U.S. Cl.
CPC ............... *B23P 15/00* (2013.01); *B23P 11/00* (2013.01); *A47J 27/002* (2013.01); *B23P 2700/05* (2013.01); *A47J 27/022* (2013.01)
USPC ............................. 29/592; 228/141.1; 99/324

(58) Field of Classification Search
USPC .............. 29/592; 228/141.1; 72/253.1–273.5; 99/324–450
See application file for complete search history.

(56) References Cited

U.S. PATENT DOCUMENTS

| 2,198,647 | A | * | 4/1940 | Wolcott | 99/340 |
|---|---|---|---|---|---|
| 4,029,253 | A | * | 6/1977 | Cartossi | 228/175 |
| 4,676,151 | A | * | 6/1987 | Gorsuch et al. | 99/450 |
| 4,768,427 | A | * | 9/1988 | Cheng | 99/422 |
| 4,926,843 | A | * | 5/1990 | Vocke et al. | 126/390.1 |
| 5,257,717 | A | * | 11/1993 | Galle | 228/173.6 |
| 5,357,850 | A | * | 10/1994 | Coudurier | 99/422 |
| 5,564,589 | A | * | 10/1996 | Fu et al. | 220/608 |
| 5,711,290 | A | * | 1/1998 | Kim | 126/390.1 |
| 5,809,630 | A | * | 9/1998 | Coissard | 29/505 |
| 6,082,611 | A | * | 7/2000 | Kim | 228/265 |
| 6,092,520 | A | * | 7/2000 | Hasegawa | 126/390.1 |
| 6,293,458 | B1 | * | 9/2001 | Sarnoff | 229/5.82 |
| 6,612,115 | B2 | * | 9/2003 | Luo | 62/3.6 |
| 6,698,337 | B1 | * | 3/2004 | Park | 99/342 |
| 6,782,599 | B1 | * | 8/2004 | Sollo | 29/521 |
| 7,097,064 | B2 | * | 8/2006 | Cheng et al. | 220/573.1 |
| 7,150,279 | B2 | * | 12/2006 | Cheng et al. | 126/390.1 |

(Continued)

FOREIGN PATENT DOCUMENTS

JP    2002177134 A  *  6/2002

*Primary Examiner* — Jacob Cigna

(57) ABSTRACT

Techniques for designing and creating energy efficient cookware are provided. In accordance with the techniques cookware can include a cookware base having a cooking surface and heating surface. The heating surface can have a pattern of fins forming heat exchange channels. The channel fins can improve energy transfer while providing even distribution throughout the cooking surface. Methods of making the energy efficient cookware are provided. Methods of direct forming channel fins by impact bonding and forging are disclosed.

11 Claims, 5 Drawing Sheets

A piece of cookware with linear pattern of channels

(56) References Cited

U.S. PATENT DOCUMENTS

| | | | |
|---|---|---|---|
| 2005/0205646 A1* | 9/2005 | Cheng | 228/101 |
| 2007/0051731 A1* | 3/2007 | Cheng | 220/573.1 |
| 2007/0193575 A1* | 8/2007 | Jan | 126/390.1 |
| 2008/0223359 A1* | 9/2008 | Huang | 126/390.1 |
| 2010/0083949 A1* | 4/2010 | Lisheng | 126/390.1 |
| 2010/0084412 A1* | 4/2010 | Huang | 220/608 |
| 2010/0206884 A1* | 8/2010 | Tunstall | 220/573.1 |
| 2010/0242257 A1* | 9/2010 | Huang | 29/592 |

\* cited by examiner

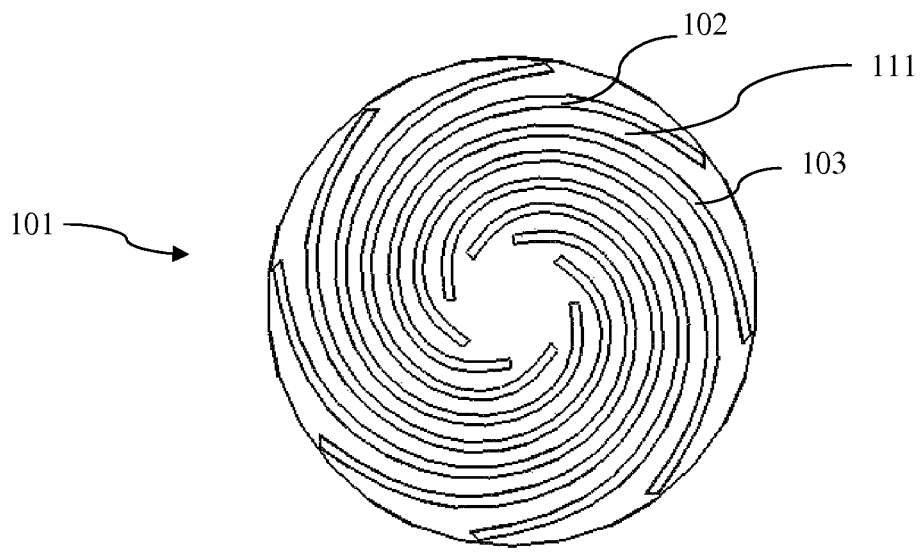
FIG. 1 A radial pattern of heat exchange channels
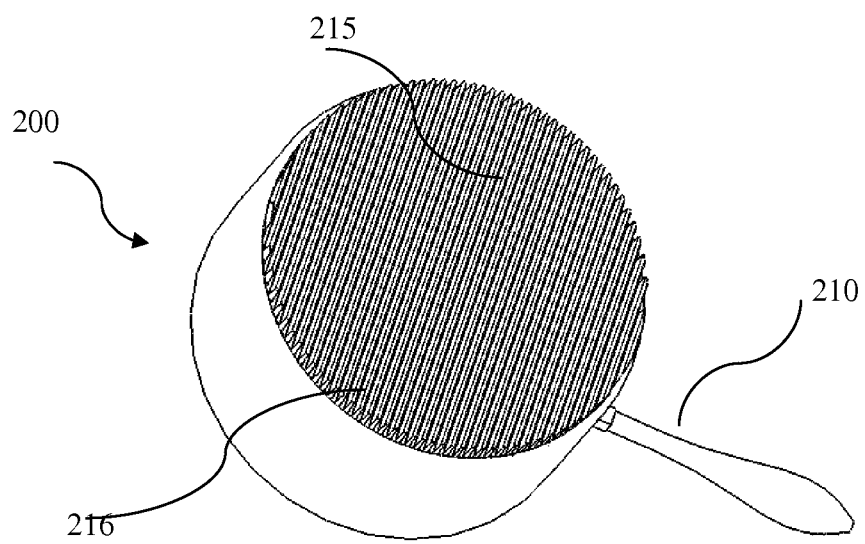
FIG. 2 A piece of cookware with linear pattern of channels

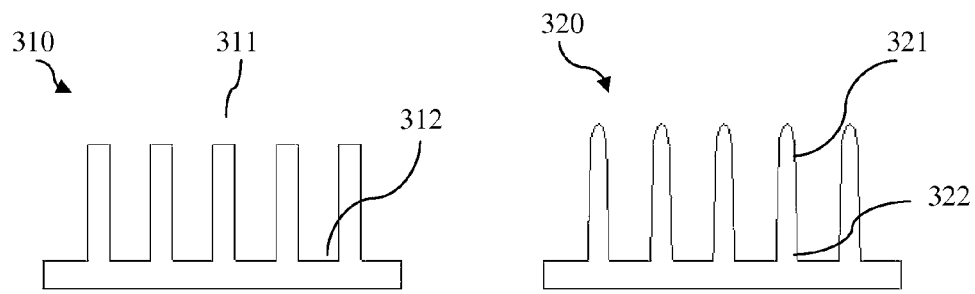
FIG. 3.1 Guide fins with flat top     FIG. 3.2 Guide fins with rounded
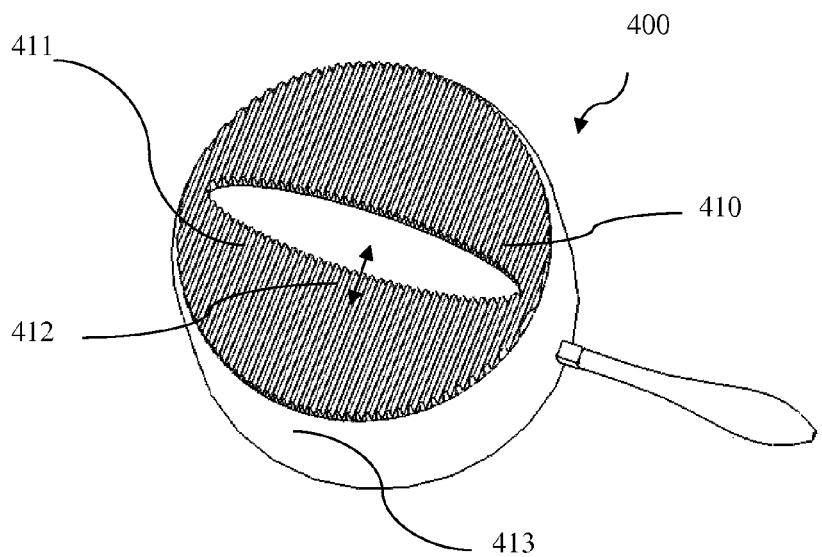
FIG. 4 A piece of cookware with an elliptical entrance opening in exchange channels

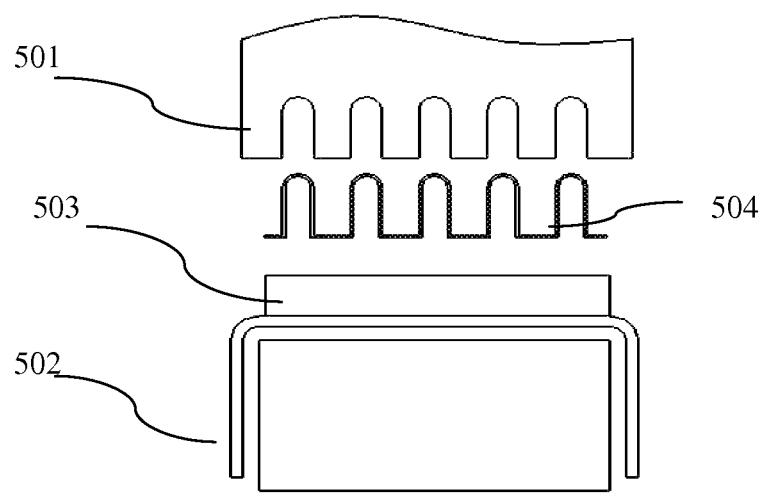
FIG 5.1 Impact Bond Extrusion Process
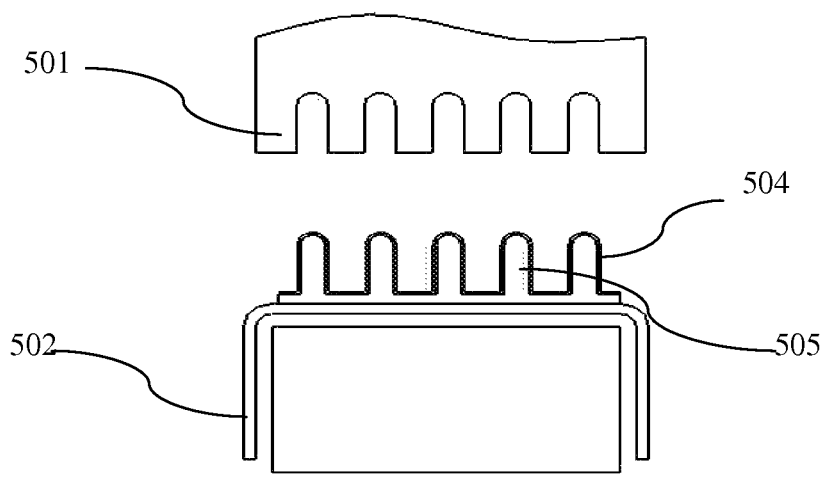
FIG 5.2 Impact Bond Extrusion Process

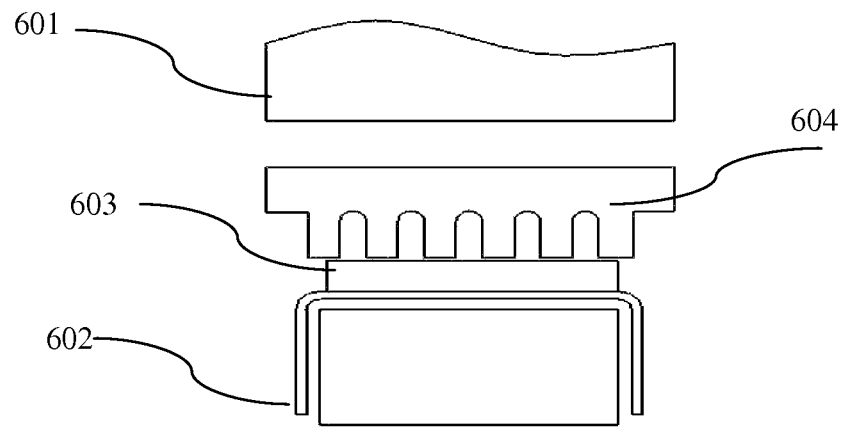
FIG 6.1 Impact extrusion process with removable extrusion punch
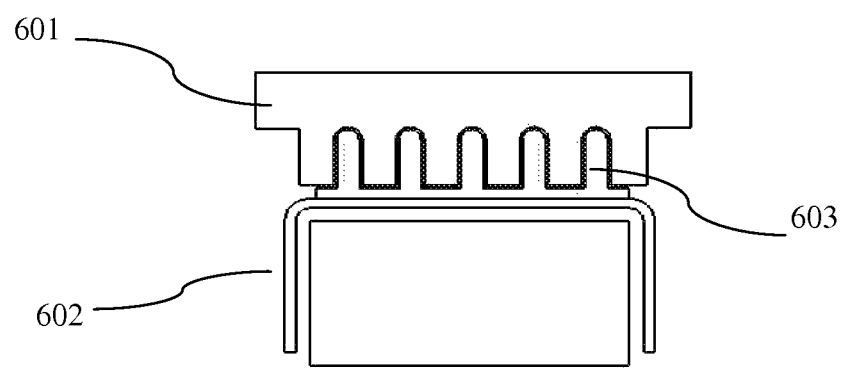
FIG. 6.2 Removable punch with pot assembly

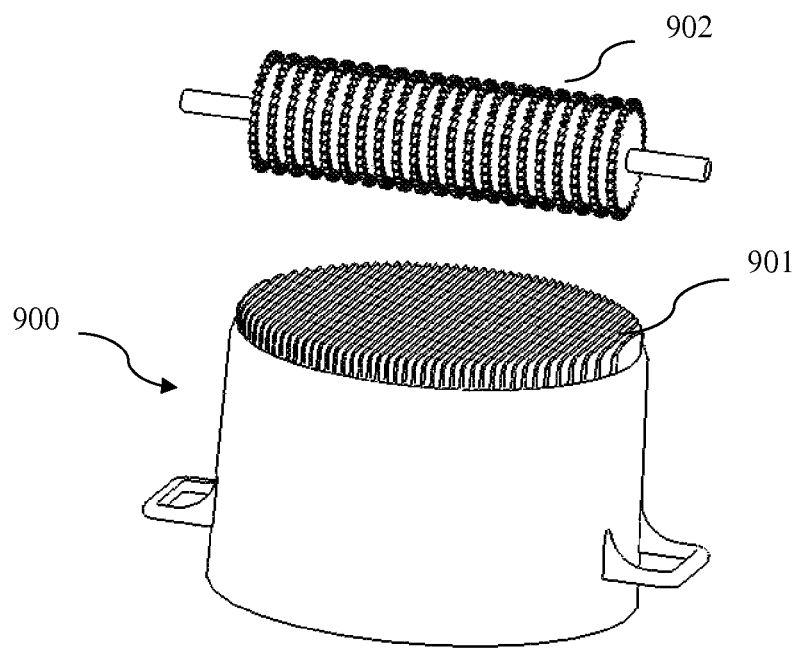
FIG. 7  A gang blade cutting setup

METHODS OF MAKING ENERGY EFFICIENT COOKWARE

RELATED US APPLICATION DATA

Continuation-in-part of U.S. application Ser. No. 12/413,444, filed Mar. 27, 2009. Continuation in part of PCT application no. PCT/US09/51980 filed Jul. 28, 2009.

FIELD OF THE INVENTION

The following disclosure relates to the manufacture of energy efficient cookware. More particularly, the present invention teaches a variety of manufacturing methods for cookware that efficiently transfers thermal energy from a heating element to a cooking surface.

BACKGROUND

Cookware is used to hold and apply heat to food. Exemplary pieces of cookware include a stock pot, a wok, and a frying pan. Although each of these have different shapes, they each include two basic elements: one surface for receiving thermal energy from a heat source, a "heat-receiving surface," and one surface for applying the heat to food, a "cooking surface."

Thermal energy can be generated from many different sources. Examples include electric and gas ranges. A heat source can generate the thermal energy by, e.g., burning gas, electricity running through a heating coil, etc.

When cooking food, the piece of cookware transfers thermal energy from the heat source to a heat-receiving surface. The food in the cookware then absorbs heat from the cooking surface, cooking the food.

Thermal energy transfer from combustion sources can be inefficient. For example, cooking on a gas range is reported to be only about 30% efficient. This means that a lot of energy is wasted when cooking. The inefficiency increases energy bills and releases unnecessary, undesirable $CO_2$ into the environment.

Prior efforts have been directed to increasing the efficiency of gas ranges. For example, others have optimized burners to create an efficient mix of air and fuel to completely combust the fuel. However there have been limited efforts to improve the efficiency of the heat-receiving surfaces of cookware.

The foregoing examples of the related art and limitations related therewith are intended to be illustrative and not exclusive. Other limitations of the related art will become apparent upon a reading of the specification and a study of the drawings.

SUMMARY OF THE INVENTION

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A piece of cookware typically has a cookware base and a cookware wall. The cookware wall typically extends vertically from the perimeter of the cookware base. By way of example, in PCT patent application no. PCT/US07/07276, the present inventor suggests incorporating flame guide channels into the cookware base to improve the cookware.

In addition to the radial pattern with perturbation feature in the channels in PCT patent application no. PCT/US07/07276, the present inventor herein discusses a pattern of linear guiding channels in PCT/US09/51980. The pattern of linear guide channels can effectively increase the surface area of the cookware base of the piece of cookware. This effectively increased surface area maximizes heat absorption by the cookware base. The channel enhances the heating surface, improving thermal energy transfer and offering higher performance than the original plain cookware base.

To have efficient heat transfer, the fins forming the exchange channels increase surface area for heat exchange. In order utilize the extended surface area, it is important to facilitate entry of the flame into the channels. To facilitate the entrance of the flame, fins can be constructed so as to reduce entrance impedance. Two aspects of doing so include tapering the fins and rounding the tips of the fins. When tapered, the width of the fins can be thinner at their extent and thicker at the cookware base. Rounding the fins can reduce flow entrance impedance.

To further improve the flame flow into the channels, the cookware base of a piece of cookware can include a flame entrance opening in the channel pattern on the cookware base. Flames can fill the opening and flow out through the channels, heating the cookware base.

In the method patent application PCT/US09/51980, the author presented a way to make the cookware by providing a thicker base to a standard cookware, and creating heat exchange channels in the thick base. That involves saw cutting for straight channels and end mill cutting for other patterns. As in typical machine work, saw cut and machining will create some burrs on the machine part that need to be removed in the post machining processes.

As an extension of that method patent, it is an advance in the art to provide an improved manufacturing method that will form the fins in the same process of impact bonding to form the thick base of a cookware.

Alternatively forging is used to form the fins on the thick base of a cookware so as to reduce time and material scraps, thus lowering the manufacturing cost.

BRIEF DESCRIPTION OF THE FIGURES

Objectives and advantages disclosed herein will be understood by reading the following detailed description in conjunction with the drawing, in which:

FIG. 1 shows an example of a radial pattern of heat exchange channels on a cookware base.

FIG. 2 shows an exemplary unit of cookware with a linear pattern of heat exchange channels.

FIG. 3.1 shows an example of guide fins having flat tops.

FIG. 3.2 shows an example of guide fins having rounded tops.

FIG. 4 shows an example of a unit of cookware with an elliptical flame entrance opening in the center region of the cookware base.

FIG. 5.1 shows an example of impact bond extrusion forming fin during impact bond.

FIG. 5.2 shows an example of impact bond extrusion forming fins during impact bond with release stainless layer FIG. 6.1 shows an example of an impact extrusion process with removable punch.

FIG. 6.2 shows an example of a removable punch on a cookware after extrusion.

FIG. 7 shows an example of a setup for manufacturing guide fins using a gang blade cutting device.

DETAILED DESCRIPTION

Although the following detailed description contains many specifics for the purpose of illustration, anyone of ordinary skill in the art will readily appreciate that many variations and alterations to the following exemplary details may be made. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

In a typical process for cooking food, a piece of cookware holding a medium, such as water, is placed on a gas range having a burner. When ignited, the burner produces a flame that rises up in response to pressure of the gas in the range's supply piping. The buoyancy of the hot air causes the flame to touch the cookware base of the cookware. Thermal energy is transferred from the flame to the cookware base via convection as well as thermal radiation. One side of the cookware base, the heat-receiving surface, absorbs the thermal energy. In the cookware base thermal conduction transfers this thermal energy to the cooking side of the cookware base. The cooking side of the cookware base then transfers thermal energy to the medium (e.g. water or food) via conduction and convection.

In the typical cooking process the most inefficient transfer of energy is the transfer of thermal energy from the flame to the cookware body. Generally convection is inefficient because convection is limited by a thick boundary layer inhibiting transfer of thermal energy from the flame to the cookware base.

To improve the heat transfer from the flame to the cookware, it is useful to create heat exchange channels on the base of a cookware. FIG. 1 shows an example of a radial pattern of heat exchange channels on a cookware base. Heat exchange channels can improve the efficiency of thermal energy transfer from the flame to the cookware base of a piece of cookware. FIG. 1 shows the bottom view of the piece of cookware 101 having a pattern of channels formed by fins protruding upward from the cookware base.

As used herein, a "flame guiding channel" is defined as the space bounded by a downward first fin, a downward second fin and a section of the cookware base between the downward first and second fins. The buoyancy of the hot flame works with the fins and the base to fill this well defined physical 3-D channel. For example, fin 102 and fin 103 collectively form channel 111 in the space between them on the base of the piece of cookware. During operation, flame passes through the channel distributing thermal energy to the fins and base.

A recognizable heat exchange effect is well pronounced where the ratio between the height of the fins and the distance between the fins is larger than one. Other ratios may generate a recognizable heat exchange effect as well.

In order to have a relative constant channel width, the design of the channels can be arranged in a polar array of spiral lines. The distance of the spiral is constant and therefore the channel width is relatively constant along the length of the flame propagation as shown in FIG. 1.

FIG. 2 shows an exemplary unit of cookware with a linear pattern of straight heat exchange channels. The piece of cookware 200 includes a linear pattern of channels 215. The channel width is substantially constant along the length of the channels. In typical use, a flame from a burner will expand near the center of the cookware base. Once the flame enters the channels, the channels will guide the flame towards the perimeter of the cookware base of the piece of cookware. Eventually the flame exits the channels at the perimeter in area 216. As the flame flows along the channels the cookware base and fins absorb thermal energy.

Advantageously, there is a substantial improvement in energy efficiency when using cookware having a linear channel pattern. For example, consider a piece of aluminum cookware having an 8 inch diameter with guide fins having a width of 0.08 inches, and a gap of 0.15 inches and a height of 0.5 inches. This exemplary piece reduced heat up time by about 50% as compared with a similarly sized conventional piece of cookware with a plain base. Therefore, the decrease in heat up time indicates the significantly improved energy utilization with the heat exchange channels.

To efficiently transfer thermal energy, the hot flame needs to flow freely into heat exchange channels. However, this requirement needs to be balanced with a desire to enhance the surface area of the cookware base of a piece of cookware with as many fins as possible. To enhance a large surface area, it can be desirable to have dense fins. Dense fins often have thinner fins and also have narrower channel widths. However if the width of the channel is too narrow, the fin density can impede hot flames from entering the channels. The impedance $\Omega_e$ is defined as the ratio between the thickness of the fin at the entrance $\omega_f$ and the width of the channels $\omega_c$ ($\Omega_e = \omega_f / \omega_c$). To reduce the flame entrance impedance, $\Omega_e$, the thickness of the fins should be small. However, when the fins are too thin the fins will be more easily damaged during daily use. There is optimization consideration trading off the need of denser fins and the robustness of the fins.

One way to reduce the impedance without decreasing the thickness of the fins is to sharpen the top of the fins by rounding and/or tapering. FIG. 3.1 shows an example of guide fins having flat tops. In FIG. 3.1 the fin structure 310 includes fin width 311 and channel width 312. Fin structure 310 has a flat fin top. The impedance of the air can be represented by the ratio of fin width 311 to channel width 312. FIG. 3.2 shows an example fin structure 320 having fins with rounded tops. The tops of the fins are smaller making the effective width of the fin smaller thereby reducing the impedance of hot flame into the channels. FIG. 3.2 also depicts the fins as tapered, having a top end 321 than the cookware base end 322. This rounding and tapering can reduce the impedance $\Omega_e$ thereby improving the thermal energy transfer efficiency. Also, if the channel width is too narrow, friction may reduce flow speed inside the channels and therefore impede the entrance of the flame into channels.

The flame flow entrance impedance $\Omega_e$ plays an important role in the efficiency of cookware. Consider the following experiment on a piece of cookware with guide fins having a width of 0.08 inches, a gap of 0.1 inches and height of 0.5 inches. As compared with the previous example of guide fins width of 0.08 inch, gap of 0.15 inch and height of 0.5 inch, this channel fin density is higher. Therefore efficiency was expected to be higher because of the higher surface area. However the efficiency dropped by 10% from the design described above, resulting in 50% overall efficiency. This is because entrance impedance $\Omega_e$ is 0.8 in this example, as compared with the previous example, which illustrated an impedance $\Omega_e$ of 0.53. The higher flow entrance impedance makes the efficiency lower even though the effective surface area is larger.

One extra advantages design for linear pattern flame channel is that the handles of the cookware to be placed on cookware wall at locations away from the output of the channels. As shown in FIG. 2, advantageously, the handle 210 will not be heated by flames escaping from the channels at location 216. This can reduce the risk of injury.

For radial pattern, the direction of the channel can change as it propagates from the center to the perimeter. So it is important to align the flame direction of a gas burner to the channel direction so that that the flame can get in the channel effectively. For example, if the spiral pattern on the cookware base is running clockwise viewing from the bottom, then the flame direction of the burner should be counter clockwise so that the pot put on the stove, the flame direction will be along the channel direction to have efficient heat transfer.

An entrance opening is another way to facilitate entry of the flame into the channels. An entrance opening is an area of the cookware base where the height of the fins is zero or is substantially lower than the height of the other fins. For example a manufacturing process could create a circular area in the center of a cookware base without fins. The size of the area may match the size of a flame from a burner. In operation, the flame will exit the burner, rise up due to buoyancy into the entrance opening and be bounded by the cookware base inside the entrance opening. The hot flame is then forced into the channels, and escapes from the perimeter of the cookware base. This use of an entrance opening allows flames to completely enter into the channels thereby improving efficiency. Typically burner flame patterns are circular or shaped like a donut, however, a circle, an elongated circle, an ellipse, or a similar shape may be suitable.

For example, FIG. 4 shows an example of a unit of cookware with an elliptical flame entrance opening in the center region of a cookware base. In this case, the piece of cookware is a pot. The piece of cookware 400 has exchange channel pattern 410, and there is an elliptical entrance opening 411 in the center region of the cookware base of the piece of cookware 400. This elliptical opening can be matched with the conventional range flame pattern to facilitate the entry of flames into channels. The short axis 412 of the elliptical shape is in the direction of the channels 410. As a positive aspect of the flame entrance opening, hot flame entering the opening is forced out through mostly all of the channels. However, a negative aspect of the opening is that the length of the channels in region 413 is somewhat reduced.

To preserve the length of the linear channels for effective heat exchange, a rectangular entrance opening can also be used. A rectangular entrance opening can be made in the center region of the channel pattern, which will be oriented such that the longer side of the rectangle is perpendicular to the direction of the channels. This rectangular flame entrance opening in the channel fins can allow the flame to flow into the channels efficiently.

In order to achieve the benefits of the energy efficient cookware in a market place, it is important to manufacture the heat exchange channels cost effectively with an energy efficient manufacturing process.

One method described in PCT/US09/51980 suggests bonding a thick aluminum plate to a piece of stainless steel cookware and then creates the channels inside the thick aluminum cookware base. Stainless steel is not a very good thermal conductor and can provide uneven heat when cooking. To improve stainless steel cookware, an aluminum plate is usually bonded to the cookware base of the stainless steel. The attached aluminum is intended to improve the heating uniformity by spreading the thermal energy laterally. In the impact bonding process the cookware and the aluminum plate are heated by induction up to temperature about 400 C, and are placed in an impact bonding machine that will exert large pressures around 5000 psi through a mold to press the two metals together.

To achieve energy efficient cookware, a thicker than ¼" aluminum plate is impact bonded to the cookware base such that heat exchange channels can be machined into a thick cookware base. This can be done by end milling the cookware base using a mill. Alternatively, use of a cutting wheel can be faster if the channel pattern is linear.

Also mentioned in the PCT/US09/51980, if the mould used in the impact bond process has structure complementary to the fin structure, one can impact bond a heat sink to the base of a cookware. When applying this featured mould to impact bond a plain sheet of thick metal to the base of a cookware, the fins pattern will be imprinted into the thick metal in the same process of impact bonding. There are several benefits that come with this direct impact with featured mould: firstly, the fins are formed at the same time of the impact bond; secondly, the fins made from a mould can be made to have a rounded head easily and consistently when the mould feature is rounded; thirdly, the fins are raised up by squeezing the material from between the fins, therefore reducing scrap.

In this impact bond extrusion process, the mould of the impact bond will have a pattern that is complementary to the fin pattern. During the impact moment, aluminum will be in a molten state so it will deform to conform to the mould shape. Therefore the impact process fulfills two functions: bonding the aluminum plate to the base of the cookware; and forming the fins on the aluminum plate. As show in FIG. 5.1 the mould 501 of the impact bond has a structure that is complementary to the fin structure to be made. The temperature of the aluminum plate 503 and the cookware 502 is heated up to about 400 C before the impact bond. During the bonding impact, the high pressure from the impact bonding machine presses the aluminum to bond with the stainless cookware. Under the high pressure, the aluminum plate is molten filling up the space between in the mould. As seen in FIG. 5.2 Aluminum plate 503 is bonded to the stainless cookware 502 and at the same time the fins 505 is formed during the impact bonding process. The cookware 502 will be cooled down by either moving air or water. The aluminum will shrink at lowering temperature to be released from the mould. The fin pattern generated from this process will be rounded on the top, eliminating the need for deburring necessary in other mechanical processes. However the possible sticking of aluminum to the mould will reduce the fin height that can be generated. Typically lubricant will be used in the mould to help prevent the sticking of the aluminum to the mould.

To further facilitate the release of the cookware from the mould after impact bond extrusion, a thin layer of stainless steel 504 as a release layer is placed in between the mould and the aluminum. The thickness of the stainless steel foil can be less than 0.05 mm. Stainless sheet 504 is pre-stamped to conform to the feature of the mould before impact bonding. During the impact bond as the aluminum melt and fill in voids of the mould to form fins, it will make contact to this stainless steel layer 504. During the impact bond process, the aluminum will be bonded to the stainless steel cookware 502, and at the same time bonded to the thin release layer of the mould. When the mould 501 is pulled away from the cookware after the impact bond, the release layer 504 will be separated from the mould 501 and stay with the cookware. This thin layer of stainless steel will act as protection layer the for the aluminum fins during the use of the pot. The mould release layer may be just plain mould releasing oils that help facilitate the mould release after the impact bond. The mould features can be fabricated such that there will be fewer sharp corners and edges on the fins, as this will minimize post processes, greatly simplifying the manufacturing process.

In this process, the aluminum in the plate will be squeezed upward to form the fins, therefore in the radial pattern, the fins form channels while in the middle of the pattern there are no fins and therefore naturally forms a flame entrance opening whose advantages is described above.

As indicated above, during the impact bond extrusion process, there is some movement of the aluminum upward to fill the fin cavity of the mould, resulting in a reduction of amount of impact force to bond the aluminum to the cookware than the standard process of using a plain mould where the aluminum is getting compressed to bond to the stainless cookware under the full force generated from the impact bond machine.

So an alternative is to impact bond the aluminum plate on the cookware using standard impact bond mould without fin features first which will result in strong bonding strength between the aluminum plate and stainless steel cookware; then forge extrude the fins structure in the aluminum using a die/mould with a structure that complementary to the fin structure. This forge extrusion method can also be called impact extrusion. Multiple extrusion impacts can be applied to create fins and increase the fin height. The impact extrusion can be done at temperatures lower that for impact bonding so that the aluminum will have less chance to stick on the die during extrusion impacts, allowing easy die releases. The process can be performed at room temperatures. Lubricant will be used to prevent sticking. A release mechanism can be implemented to release the pot from the die after the impact extrusion. It is reported the aspect ratio between the height of the fin and the gap between the fins can be achieved by micro-forging method to be 30:1 on a smaller scale of 5" base. In the current design for fins in the cookware, the aspect ratio is less than 4:1; therefore it is achievable by impact extrusion on a cookware of 10" in diameter.

For example, to produce an aluminum heat channel base with 12 mm fin height and 2 mm base, an aluminum plate of 6 mm will be impact bonded to the stainless steel cookware base. Wait till the assembly is cooled down, a die with ridges of 4 mm width with 2 mm gap in between can be use to impact extrude the aluminum plate to become fined with 2 mm wide fins and 4 mm gap in between. A release mechanism will push the assembly off from the extrusion die. Alternatively the extrusion die can be removable from the machine. As seen in FIG. 6.1, punch 601 of the machine has a flat face, and the extrusion die 604 with features is placed on bottom of the stainless steel pot 602 which has a piece of aluminum 603 impact bonded on. During the impact extrusion, the punch 601 impacts on the die 604 which in term presses into aluminum 603 forming the fins. After the impact, the die and the pot are stuck together by friction as shown in FIG. 6.2. This assembly can be removed from the impact machine and put on to a hydraulic press to separate the extrusion die and the pot.

Depending on the capacity of the impact bond machine, the fin height may be limited. Also the higher the fins are produced, the more difficult it will be to release the mould. One simple solution is to increase the fin height from the impact forged fin height is to machine remove material from the aluminum plate in between the fins.

Machine removing the material in between the fins can still preserve the advantage of rounded fin tops from the forge method resulting in minimum deburring processing after machining. The fins formed by the forging requires less machining compared to what is typically needed for machining the fins from full depth from a flat piece of metal.

Removing material off from between fins can be done in different ways. For linear channel designs, it is possible to use cutting methods such as a circular metal cutting blade which can have a faster cut rate with many teeth on the blade. Another good system would be an array of saws that can cut can cut all of the channels at the same time.

FIG. 7 shows an example of a setup for manufacturing guide fins using a gang blade cutting device. In FIG. 7 the cookware base of the pot 700 is cut by gang blade setup 701. The thickness of the blade can be the width of the channel, for example 0.15 inch. The blades can be spaced an equal distance apart, if equally spaced channels are desired. Where equally spaced channels are desired and where the number of channels is a multiple of the number of blades, the space between blades can be a multiple of the combined width of a channel and a fin. Then the gang blade can cut the entire cookware base of a piece of cookware in a few passes, where the blade is offset by the width of a channel at each pass.

Alternatively, where non-equally spaced fins are desired, the width of the blades can vary along the gang-blade axis. When run, the gang-blade will produce non-equally spaced fins. Advantageously, when cutting more disparately spaced fins, the blade can still complete the entire cutting process in a single run.

For radial pattern channels, machining will be performed by a high speed end milling head, using a CNC mill that can trace the pattern of the channels. A high speed end milling head with over 20000 rpm can be used to efficiently remove material between the fins.

When cutting a thick composite metal cookware base, different cutting blades may be required to achieve an optimal production yield. For cookware with a thick composite cookware base having a stainless steel protection layer it may be desirable to use two blades. A first blade with a tooth profile that has been optimized for cutting steel can skim off the stainless steel layer (the "thin skin"). Then a second blade with a tooth profile tailored to cutting aluminum can quickly run through the thick aluminum. The remaining product will include a layer of the stainless steel covering the aluminum fins, but exposing the aluminum channels. The width of the blade cutting the stainless steel can be slightly wider than the blade that cuts the aluminum so that the stainless opening is sufficiently large enough to allow the aluminum cutting blade to enter with no obstruction. It is also possible to design the width of the cutting blade to be tapered such that the cookware wall of resulting fins can be thinner at the tips. This will allow the flame to enter the channels with low impedance as described above.

Besides using impact bonding to produce the rounded edge fins, casting can also produce round top fins. Typically die casting can produce the fin density suitable for the cookware; however it may be challenging to achieve this high density fins on a larger cookware. Other casting methods can be more suitable for making bigger cookware, however with a lesser capability of generating fine features, especially the high aspect ratio between full fin height and width. Fins with reduced fin height can be easier achieved by other casting methods such as gravity casting, etc. on larger sized cookware. A cast cookware with a thick base of reduced sized fins can then be machined to achieve the desired fin height therefore the desired efficient heat transfer property.

The cookware can then be coated with a non-stick coating, or coated with other cosmetic and/or protection coatings to provide the finishing touch. For example all the exposed aluminum including the heat exchange structure on the base can be hard anodized to improve the surface hardness.

It will be appreciated by those skilled in the art that the preceding examples are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

What is claimed is:

1. A method of making a piece of energy efficient cookware comprising:
   providing a piece of cookware having a wall and a base, the base including a heating surface and a cooking surface; and
   impact bonding a piece of metal on the base using a patterned mould, simultaneously extruding said metal to create fins with a height of larger than 6 mm in a pattern complementary to the pattern of the mould operable to transfer thermal energy from a heat source to the cooking surface.

2. The method of claim 1, wherein the cookware comprises stainless steel.

3. The method of claim 1, wherein the cookware comprises aluminum.

4. The method of claim 1, wherein the said metal piece is aluminum.

5. The method of claim 1, wherein the said metal piece is copper.

6. The method of claim 1, wherein the said metal comprises of two different metals.

7. The method of claim 1, wherein the said fin height is further extended by removing material from the said metal piece between the fins.

8. A method of making a piece energy efficient cookware comprising:
   providing a piece of cookware having a wall and a base, the base including a heating surface and a cooking surface; and
   impact extruding the said base using a patterned mould to create fins with a height larger than 6 mm in a pattern complementary to the pattern of the mould operable to transfer thermal energy from a heat source to the cooking surface.

9. The method of claim 8, wherein the cookware is a stainless steel cookware with an aluminum base impact bonded on.

10. The method of claim 8, wherein the cookware comprises aluminum.

11. The method of claim 8, wherein the said fin height is further extended by removing material from the said base between the fins.

* * * * *